United States Patent [19]

Kaufman et al.

[11] Patent Number: 4,518,511

[45] Date of Patent: May 21, 1985

[54] DELIVERY OF POLYMERIC ANTIPRECIPITANTS IN OIL WELLS EMPLOYING AN OIL SOLUBLE CARRIER SYSTEM

[75] Inventors: Ernest D. Kaufman, North Yorkshire; Robin W. Dexter, Yorkshire, both of England

[73] Assignee: American Cyanamid Company, Stamford, Conn.

[21] Appl. No.: 202,859

[22] Filed: Oct. 31, 1980

[30] Foreign Application Priority Data

Nov. 21, 1979 [GB] United Kingdom ................ 7940179

[51] Int. Cl.$^3$ ..................... E21B 37/00; E21B 41/02
[52] U.S. Cl. ........................... 252/8.55 B; 166/244 C; 166/279; 166/310; 252/8.55 E
[58] Field of Search ................... 252/8.55 B, 8.55 C, 252/180, 8.55 E; 260/29.6 WQ; 166/279, 310, 244 C

[56] References Cited

U.S. PATENT DOCUMENTS

| | | | |
|---|---|---|---|
| 3,284,393 | 11/1966 | Vanderhoff et al. | 260/29.6 HN |
| 3,418,237 | 12/1968 | Booth et al. | 210/734 |
| 3,463,730 | 8/1969 | Booth et al. | 252/86 X |
| 3,663,448 | 5/1972 | Ralston | 252/8.55 B X |
| 3,704,750 | 12/1972 | Miles et al. | 252/8.55 B X |
| 3,734,873 | 5/1973 | Anderson et al. | 252/363.5 X |
| 3,879,288 | 4/1975 | Siegele | 252/180 |

Primary Examiner—Herbert B. Guynn
Attorney, Agent, or Firm—Gordon L. Hart

[57] ABSTRACT

There is provided a method for treating a subsurface oil field formation penetrated by an oil-producing well bore comprising: injecting into said formation an emulsified, oil soluble polymeric composition of a polymer.

3 Claims, No Drawings

DELIVERY OF POLYMERIC ANTIPRECIPITANTS IN OIL WELLS EMPLOYING AN OIL SOLUBLE CARRIER SYSTEM

The present invention relates to an emulsified oil-dispersible polymeric antiprecipitant composition and to a method for delivering the same to producing oil wells. More particularly, it relates to an oil-emulsified aqueous solution of certain polymers adapted for treating oil wells to inhibit scale deposition therein, and to the use thereof in the treatment of a producing well.

It is known that in the "squeeze" treatment of unfractured, producing oil wells, chemicals are injected into the well bore of the producing well to place the chemicals into the formation. The chemicals added may be for various purposes, for example, corrosion inhibition, scale inhibition or removal, or for precipitation control. In general, the chemical should be placed far enough into the formation so that its release from the well should be gradual, thus keeping the formation open to the passage of oil for as long as possible.

In many cases it is found that, especially with water-based fluids, the chemical content of the fluid is expelled rapidly from the well bore when once the flow of oil is recommenced, leaving the formation unprotected. In such cases, treatment of the well may have to be repeated at short intervals of time to ensure that the oil well continues to produce.

In addition, use of a water-based, water-soluble solution of the chemical does not allow direct penetration of certain parts of the formation which are occupied by oil, since the viscosity of the water-based solution is normally low and does not displace the oil. Further, the use of an oil based dispersion of the chemical advantageously penetrates the formation, but it is not effective when the chemical is required to prevent precipitation or scale-formation, both which occur in the aqueous phase. There is, therefore, a long felt need in the art to provide an oil-based antiprecipitant which would partition rapidly into the aqueous phase when in contact with water-in-oil well formations and prevent the precipitation of sparingly soluble salts, particularly, in producing wells where water present therein contains barium or calcium ions which come into contact with surface waters containing sulphate ions which produce barium or calcium sulphates.

It has been found that an oil-based, antiprecipitant formulation of the present invention can be pumped into the formation against the formations oil-pressure until the required estimated penetration of the formation had been achieved. The antiprecipitant formulation would be dispersible in the oil phase and would penetrate farther into the formation than an aqueous-based material. When in the formation, the dispersant would "break" or be released when in contact with water, and at precisely those points where it is required. After the slug of oil-based, antiprecipitant has been pumped in, it is followed by a slug of oil to push the precipitant farther into the formation. Finally, the well is allowed to produce oil once more, after a total period of stoppage of from about four to about twelve hours.

There is further provided in the formulation of the present invention, a water soluble dispersant. It is rendered dispersible in oil by means of a water-in-oil emulsion in which the aqueous phase contains the dispersant. This emulsion is so formulated that on contact with water it inverts thereby becoming dispersible in the contact water.

In general, the use of an oil-based, antiprecipitant formulation has the added advantage over water-based formulations in that the permeability of the formation is not greatly altered, so that the oil production rates remain at a constant and high level. Thus, the use of the oil-based antiprecipitant can extend the period between "squeeze" treatment operations from a matter of days to a much longer time, two months or possibly more, thereby increasing the average rate of oil production, without intermittent, frequent "squeeze" operations.

According to the invention, there is employed an oil-dispersible, emulsified polymeric antiprecipitating composition wherein the antiprecipitant is a low molecular weight polymer particularly adapted to possess antiprecipitating properties in the presence of oil field brines or other fluids. In brief, there is employed in a preferred form, a method of treating a subsurface oil field formation penetrated by an oil producing well which comprises the steps of introducing by injection a solution of an emulsified, oil-dispersible polymeric composition into a well and followed by an injection of oil to flush the well-bore of the inhibiting composition into the formation.

Illustrative of the polymeric component of the overall composition are copolymers of maleic acid or anhydride and allyl sulfonic acid as well as aliphatic copolymers of a monovinyl compound and a vinyl sulfonate having from about 25 mol to 75 mol percent of the sulfonate and, preferably, about 50 mol percent. Other polymeric compositions that can be employed are homopolymers of sodium acrylate or hydrolysed polyacrylamide or copolymers of sodium acrylate and acrylamide. In general, copolymers having from about 70–100% of sodium polyacrylate are preferred. The molecular weight of the polymeric compound ranges from about 500 to about 25,000, and preferably, the molecular weight should range between 500 and 10,000.

Advantageously, the water-soluble maleic acid—allyl sulfonic acid copolymer employed in the process of the present invention can be obtained in a straight forward manner by copolymerizing from about 25 mol percent of maleic acid or anhydride and, correspondingly, from about 75 to about 10 mol percent of allyl sulfonic acid, preferably about 40 to 60 mol percent of maleic acid or anhydride. Preferably, copolymers having molecular weight ranges from about 500 to 10,000 are utilized. These polymers are readily prepared as by adopting the procedure disclosed in the patent to Siegele, U.S. Pat. No. 3,879,288, which is incorporated herein by reference.

In general, the water-soluble copolymer hereinabove defined is admixed with water to a concentration that will give the required level of active solids in the final emulsion. This solution is then emulsified with the required hydrocarbon oil, for example, kerosene or low odor petroleum spirit (LOPS), using a mixture of two, or more, surfactants. One of these should have a hydrophile—lipophile balance (HLB) value of less than 8, as for example, Span 80 (sorbitan monooleate) or Arlacel 60 (sorbitan monostearate) and the other should have an HLB value of greater than 10, as for example, Surfonic N120 (alkyl aryl polyethylene glycol ether), Tween 80 (poly oxyethylene Sorbitan monooleate), or Alfonic 1412-60 [ethoxylated linear alcohol (60% E.O.)]. Such emulsions can be prepared by standard techniques well known in the art.

TABLE A

| Component | Parts by Weight |
| --- | --- |
| Water soluble polymer Solids. | 1–60, preferably 20–50 |
| Water | 15–80, preferably 20–45 |
| Hydrocarbon oil | 20–70, preferably 25–50 |
| Surfactants (Total)* | 1–20, preferably 5–10 |

*The combined HLB value of the surfactants is in the range 5–12, and, preferably, between 7 and 10, parts by weight.

It is an advantage of the present invention to employ the overall composition as hereinabove defined for delivery of a water-soluble antiprecipitant to the required oil-well site where it serves to inhibit the precipitation of or aid in the removal of sparingly soluble salts formed by the mixing of incompatible waters. In the process of the instant invention, the water-soluble antiprecipitant composition is delivered to the site as an emulsion which can be dispersed in the oil-phase in the producing strata absent alteration of the wetting characteristics of the strata and with deeper penetration into the reservoir, thereby reducing the frequency of treatment.

In order to facilitate a further understanding of the invention, the following examples are given primarily for purposes of illustrating certain more specific details thereof. The scope of the invention is not to be deemed limited thereby, except as defined in the claims. Unless otherwise noted, concentrations are expressed in parts by weight.

EXAMPLE 1

Preparation of copolymer of maleic acid and allyl sulfonic acid (sodium acid salt)

To a suitable three neck glass flask fitted with stirrer and thermometer, are added 200 grams of sodium allyl sulfonate, 250 milliliters of water and 110 grams of maleic acid. The mixture is heated and stirred until the temperature of the solution is 90° C. Through a dropping funnel fitted to the flask, 5 milliliters of 30% hydrogen peroxide solution is introduced. After one hour, an additional 5 milliliters of the peroxide catalyst is introduced. After two more hours of stirring at a temperature of 90°–98° C., the the solution is cooled. The copolymer derived from maleic acid and sodium allyl sulfonate is isolated by addition to an acetone-methanol mixture and dried in an oven. Infrared analysis and sulfur analysis are consistent with the formation of the said copolymer.

EXAMPLE 2

Repeating the procedure of Example 1 above in every respect except that fumaric acid is substituted for maleic acid, there is obtained the corresponding allyl sulfonic acid copolymer.

EXAMPLE 3

This example illustrates the preparation of an emulsion.

A solution of 5 parts of Span 80 in 25 parts of hydrocarbon oil (Gulfpar 4P) is prepared and stirred vigorously. An emulsion is prepared by pouring into the stirred oil solution, a solution consisting of 40 parts of water and 25 parts of the copolymer of Example 1. A water-in-oil emulsion results possessing a viscosity in the range of 1000–4000 cps. The resulting white emulsion is dispersible in mineral oil, but does not disperse in water, in which it separates rapidly into two layers. To render the emulsion water dispersible, 5 parts of a second dispersant, Alfonic 1412-60, is added slowly while stirring. After dissolution of the Alfonic 1412-60 surfactant, the emulsion is still oil dispersible and also has the property of "breaking" when mixed with water, thereby releasing the active polymer content as a solution.

EXAMPLE 4

This example illustrates another method for the preparation of an emulsion.

A solution of 5 parts of Span 80 surfactant and 25 parts of hydrocarbon oil is prepared and stirred vigorously. A second solution is prepared by mixing 40 parts of water, 25 parts of the copolymer of Example 1 and 5 parts of Tween 80 as the second surfactant. The second solution is then poured slowly into the first solution while stirring, to provide an emulsion. This emulsion has similar properties to that of Example 3.

EXAMPLES 5–10

The following examples illustrate compositions containing different active polymers as antiprecipitants incorporated into the emulsion formulation in which each example provides 25% active polymer content in the finished emulsion, and the values are expressed in parts per 100 parts of the total composition.

Further, as summarized in Table I below, Examples Nos. 5, 7 and 9 contain no water-soluble surfactant and, therefore, do not release the active polymer into water.

In Examples No. 6, 8 and 10, below, these are selfinverting and release the active polymer when mixed with water as summarized in Table I below.

TABLE I

| | Example Nos. | | | | | |
| --- | --- | --- | --- | --- | --- | --- |
| | 5 | 6 | 7 | 8 | 9 | 10 |
| Polymer used: | Dispersant A (1) | | Cyanamer P70 (2) | | Product (3) of Example 1 | |
| Water | 11.6 | 11.6 | 45.7 | 45.7 | 19.8 | 19.8 |
| Water soluble polymer | 58.1 | 58.1 | 25.0 | 25.0 | 50.0 | 50.0 |
| Tween 80 | 0 | 4.9 | 0 | 4.0 | 0 | 4.8 |
| Gulfpar 4P oil | 23.3 | 23.3 | 23.6 | 23.6 | 23.2 | 23.2 |
| Span 80 | 7.0 | 2.1 | 5.7 | 1.7 | 7.0 | 2.2 |
| Total parts by weight | 100 | 100 | 100 | 100 | 100 | 100 |

(1) Dispersant A is a 40% solids content product being a homopolymer of sodium acrylate.
(2) Cyanamer P70 is a dry powder, 100% active being a hydrolysed polyacrylamide.
(3) Product of Example 1 is a 50% active solids solution.

EXAMPLES 11–16

These examples illustrate how the active, water-soluble dispersed polymer solution is released from the water-in-oil emulsion when the emulsion comes into contact with water.

The extent of the liberation of the active copolymer from Examples 5–10 into the aqueous phase from the water-in-oil emulsion is demonstrated by electrical conductivity measurements of the aqueous phase after addition of the emulsion, (or visually, by the appearance of a milky emulsion of oil-in-water, when the emulsion inverts) as tabulated in Table II, below. These results indicate that the water dispersible property is conferred by the presence of the Tween 80 which causes an inversion of the emulsion to a continuous aqueous phase and a dispersed oil phase.

In these examples 10 gms. of each emulsion is added to 100 gms. of deionized water and stirred. The electrical conductance of the aqueous phase is measured and recorded at intervals up to 4 hours as summarized in Table II below.

TABLE II

Electrical Conductance of the Aqueous Phase (μ mhos)

| Time after addition of the emulsion, (minutes) | Example Nos. 11 | 12 | 13 | 14 | 15 | 16 |
|---|---|---|---|---|---|---|
| | Formulation used from Example Nos. | | | | | |
| | 5* | 6 | 7* | 8 | 9* | 10 |
| 0 | 0 | 0 | 0 | 0 | 0 | 0 |
| 30 | 167 | 1340 | 105 | 2500 | 20 | 1500 |
| 60 | 235 | 1920 | 210 | 2800 | 30 | 3200 |
| 120 | 400 | 3000 | 392 | 2800 | 70 | 3300 |
| 150 | 570 | 3000 | 450 | 2800 | 105 | 3300 |
| 240 | 650 | 3000 | 470 | 2800 | 130 | 3300 |

*Examples so marked did not "break", and therefore did not reach a maximum conductivity within 24 hours. Examples 12, 14 and 16 "broke" rapidly and liberated all the water soluble polymer in less than 4 hours.

EXAMPLES 17–20

These examples demonstrate the effect of using the two surfactants in the same ratio, but increasing the total amount from 3.6 to 18.4% in the emulsion.

All the results given are for a Span 80/Tween 80 combination of surfactants, as in Example 10, at a calculated HLB value of 9.5.

The results summarized in Table III below show the conductance measured in the aqueous phase after various times.

TABLE III

Conductance of Aqueous Phase (μ mhos)

| Time (minutes) | Example Nos. 17 | 18 | 19 | 20 |
|---|---|---|---|---|
| | Percent Surfactant w/w | | | |
| | 3.6 | 7.0 | 13.0 | 18.4 |
| 0 | 0 | 0 | 0 | 0 |
| 30 | 3200 | 1340 | 430 | 300 |
| 60 | 3200 | 1900 | 735 | 585 |
| 120 | — | 3000 | 1570 | 1340 |
| 180 | — | 3100 | 2670 | 1870 |
| 240 | — | — | 2700 | 2470 |
| 300 | 3200 | 3200 | 2700 | 2500 |

It will be noted from the above that the total surfactant level does effect the breaking rate, i.e., too low a level does not produce an emulsion, and increasing the level causes slower breaking.

EXAMPLES 21–24

The effect of HLB of the total surfactant composition on breaking rate of emulsions is shown in the Examples 21–24, using the conductance method described above. These Examples use the formulation of Example 12, but vary the ratio of surfactants, and the effects are summarized in Table IV below.

TABLE IV

Conductivity of Aqueous Phase (μ mhos)

| Time after stirring in water (minutes) | Example Nos. 21 | 22 | 23 | 24 |
|---|---|---|---|---|
| | Tween 80/Span 80 (w/w) | | | |
| | 20/80 | 40/60 | 60/40 | 80/20 |
| | HLB value | | | |
| | 6.4 | 8.6 | 0.6 | 12.9 |
| 0 | 0 | 0 | 0 | 0 |
| 10 | 45 | 420 | 3000 | 3200 |
| 15 | 115 | 650 | 3200 | 3200 |
| 30 | 167 | 800 | 3200 | 3200 |
| 60 | 235 | 1070 | — | — |
| 120 | 400 | 1670 | — | — |
| 180 | 510 | 2170 | — | — |
| 240 | 650 | 2340 | 3200 | 3200 |

These results show that breaking rate is markedly affected by the HLB value of the surfactant combination used, i.e., the required breaking rates being obtained between HLB 6.4 and HLB 10.6.

EXAMPLE 25

This example demonstrates the use of the product of Example 1 and its effect in inhibiting the precipitation of calcium sulphate.

10.0 Parts of the emulsion of Example 16 is dissolved in 100 parts of fuel oil. 20 Parts of the solution is next added to a suitable beaker containing 200 parts of a saturated calcium sulphate solution to form a floating layer on the surface.

20 Parts of fuel oil with no emulsion dissolved in it is added to a similar beaker containing saturated calcium sulphate solution.

Both beakers are boiled until approximately 100 parts of water had evaporated. In the beaker with no emulsion, considerable precipitation of calcium sulphate is observed in the aqueous phase. In the beaker with added emulsion, the aqueous phase remains clear, and no precipitation of calcium sulphate is observed.

EXAMPLE 26

In this example the composition of the invention used in a "squeeze" operation is illustrated.

A 25% active emulsion, with the polymer of Example 1 as active ingredient is injected into a well. Thirty barrels of the emulsion are used having a viscosity of 1000 cp and followed by a further 50 barrels of produced crude oil from the same well plus an amount calculated as equal to the volume of the annulus. The time taken for the squeeze operation is 5 hours and the well is then allowed to resume production. Production is resumed at a similar rate as before the treatment indicating unchanged wetting characteristics in the formvtion. Additionally, analysis of the produced fluids over a period of 4 weeks shows that the produced water contained effective levels of precipitation inhibitor in the aqueous phase.

EXAMPLE 27

A 25% active emulsion, having a higher aqueous to oil phase ratio than Example 26, and, therefore, a higher viscosity, 4200 cp, is injected into the well in a similar operation as Example 26 describes. In this case, effective levels of precipitation inhibitor are produced over a period of 7 weeks, indicating better penetration of the formation with the higher viscosity emulsion.

EXAMPLE 28

This example shows the effect of incorporating 0.5% of a copolymer of sodium acrylate 30% w/w, and acrylamide 70% w/w in the aqueous phase, together with the active ingredient of Example 1, to increase the viscosity of the aqueous phase.

The emulsion used is a 25% active emulsion, having a viscosity of 1000 cps. and is used as in Example 26. Analysis of the produced water after the "squeeze" operation showed that the antiprecipitant is present in effective quantities for a period of 6 weeks. This indicates the improved retention of the aqueous phase in the formation when The high viscosity polymer is added.

We claim:

1. A water-in-oil emulsion polymeric composition adapted for use to prevent corrosion or scaling in deep oil well-bores comprising in combination:
   (a) from 1 to 60 parts by weight of water-soluble maleic acid, allyl sulfonic acid copolymer having a molecular weight ranging between about 500 and about 25,000 in the presence of sufficient water to attain a saturated solution of the above defined polymer,
   (b) from 20 to 70 parts by weight of a hydrocarbon oil, and
   (c) from 1 to 20 parts by weight of a mixture of surfactants one of which having a hydrophile lipophile balance (HLB) value less than 8 and the other having a HLB value greater than 10 wherein the combined HLB value of the surfactants are in the range of 5 to 12.

2. The composition according to claim 1 wherein the surfactant having an HLB value less than 8 is sorbitan monooleate.

3. The composition according to claim 1 wherein the surfactant having an HLB value greater than 10 is an ethoxylated linear aliphatic alcohol.

* * * * *